Patented Feb. 28, 1950

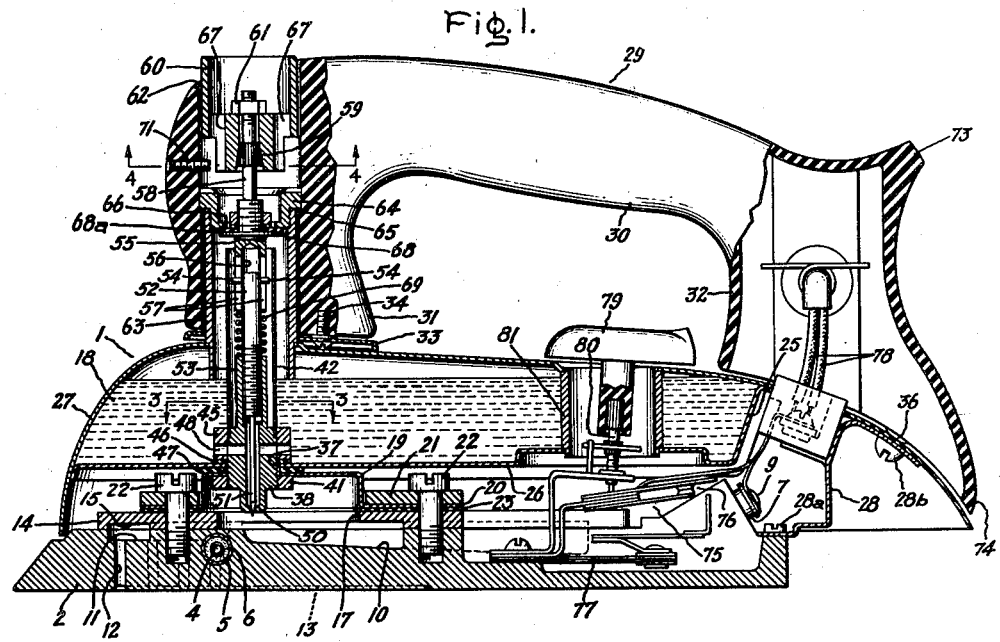

2,499,185

UNITED STATES PATENT OFFICE 2,499,185

STEAM IRON RESERVOIR WATER SUPPLY AND WATER DISCHARGE MEANS

Frank E. Finlayson, Ontario, Calif., assignor to General Electric Company, a corporation of New York Application September 11, 1946, Serial No. 696,299

17 Claims. (Cl. 38—77)

This invention relates to pressing irons, more particularly to steam pressing irons, and it has for its object the provision of an improved device of this character.

More specifically, this invention relates to a steam iron provided with a water reservoir from which the water is fed into a steam generating chamber, and while it is not limited thereto, in certain of its aspects it is particularly adapted to steam irons of the so-called closed reservoir type wherein the reservoir is not open to the atmosphere directly, but is connectable with the outside only through the steam passage means that supply steam to the soleplate pressing surface. This invention contemplates the provision of such a steam iron having an improved organization of parts; this improved organization includes, among other features, improved valve means for regulating the flow of water from the reservoir to the steam generating means; improved water fill means for the reservoir; and also improved means for creating in the reservoir a pressure above the water level therein equal to the pressure existing in the steam generating means, thereby to insure a steady flow of water from the reservoir to the generating means.

For a more complete understanding of this invention, reference should be had to the accompanying drawing in which Fig. 1 is a central longitudinal vertical sectional view taken through an electrically heated flatiron embodying this invention; Fig. 2 is a plan view of a portion of the flatiron shown in Fig. 1, parts being broken away so as to illustrate certain details of construction; Fig. 3 is a horizontal sectional view taken through the line 3—3 of Fig. 1 and looking in the direction of the arrows; and Fig. 4 is a horizontal sectional view taken through the line 4—4 of Fig. 1 and looking in the direction of the arrows.

Referring to the drawing, this invention has been shown in one form as applied to an electrically heated flatiron comprising an ironing body 1. The body 1 comprises a soleplate structure which preferably and as shown is arranged substantially as that disclosed in the United States Patent No. 2,322,593 to F. W. Riddington and F. E. Finlayson, dated June 22, 1943. This soleplate structure comprises a soleplate 2 which may be formed of any suitable material, such as aluminum and preferably it will be cast from this material. Embedded in the soleplate 2 is a suitable electrical heating element 3, which preferably will be of the sheathed type; briefly, this element comprises a helical resistance conductor 4 mounted with an outer metallic sheath 5 and supported in spaced relation with reference to the sheath by an electrically insulating, heat conducting mass 6, such as highly compressed granulated magnesium oxide. This heating element 3 is roughly in the shape of a hair pin (Fig. 2) with the extremities 7 of its two legs located at the rear of the iron, and its bight or nexus 8 at the forward end of the iron. As shown, suitable terminals 9 project from the ends of the sheath.

Formed within the upper part of the soleplate 2 is a suitable flash steam boiler or generating chamber 10 which is located in the forward central part of the soleplate between the two legs of the heating element. The walls defining this chamber are highly heated by means of the heat conducted to them from the heating element 3 so that any water entering the chamber is flashed immediately into steam. At the forward end or nose of the soleplate 2 there is a steam discharge chamber 11 which is connected with the pressing surface of the soleplate by means of a series of vertically positioned ducts or ports 12. These ports discharge into recesses 13 formed in the pressing surface of the soleplate and extending back toward the rear thereof. The steam generating chamber 10 and the steam discharge chamber 11 are provided with a common cover plate 14. In the bottom surface of this cover plate are formed a pair of identical diverging recesses 15 located at the sides and joining each other at the front, only one of the recesses 15 being shown. At their right hand ends the recesses 15 are provided with inwardly extending sections 16 which project directly over the heel ends 10a of the steam generating chamber 10, as clearly shown in Fig. 2. Thus, when steam is generated in the chamber 10, it flows upwardly into the extensions 16, thence forwardly through the channels 15 where it discharges into the steam discharge chamber 11, and from this chamber 11 it flows through the ports 12 directly to the pressing surface of the soleplate.

The cover plate 14 is provided with an opening 17 through which water is fed to the steam generating chamber 10 from a suitable reservoir 18 mounted above the soleplate, as clearly shown in Fig. 1. The opening 17 is covered by means of an inverted cup-shaped closure plate 19, which cover also functions to mount the forward end of the reservoir 18, and which preferably is made of a poor heat conducting metal, such as stainless steel. The closure plate is provided with an outwardly extending flange 20 above which is mounted a clamping ring 21. The clamping ring and the cover plate 19 are rigidly secured to the soleplate by means of screw fastening means 22 which are threaded through openings provided for them in the clamping ring and cover plate flange and which are received in tapped holes provided for them in the soleplate. Preferably, a gasket 23 will be interposed between the cover plate and the soleplate. These screws also function to fasten the cover plate 14 to the soleplate which cover plate is provided with additional screw fastening means 24 at the rear.

The water reservoir extends from a point adjacent the forward end of the iron rearwardly thereof, and it is to be understood that in horizontal cross section it has substantially the same shape as has the soleplate in plan view, as shown in Fig. 2; that is, it is pointed at the front and flares outwardly to a wide end 25 at the rear.

The reservoir, as shown, is provided with a substantially flat bottom wall 26 and with a top wall 27 which coacts with the bottom wall to form the reservoir and which also constitutes the outer shell of the iron and which has a shape similar to the usual outer shell. This top wall 27 slopes downwardly toward the rear and at its rear end there is provided a supporting bracket 28 which attaches and mounts the rear end of the reservoir to the soleplate; as shown, this bracket is attached to the soleplate by screws 28a, and to the reservoir by screws 28b.

Mounted upon the top wall 27 is a handle 29 having a generally horizontal hand-grasping portion 30 which is supported by forward and rear upright handle sections 31 and 32. Preferably, the three handle sections will be formed integrally together, and molded from a suitable phenol condensation product. Mounted below the front handle section 31 is a heat baffle plate 33 secured to this section by screws 34 and which functions to thermally insulate this part of the handle from the water reservoir. The baffle, it will be observed, has only its rear end contacting the reservoir. The rear handle standard is secured to the top wall 27 by the screws 28b, and this section is spaced from the top surface of the wall by bosses 36 through which the screws are directed so as to thermally insulate this part of the handle from the water reservoir.

In accordance with this invention an improved organization of parts is provided including improved means for regulating the flow of water from the reservoir to the steam generating chamber 10, improved means for filling the reservoir, and in addition improved means for interconnecting the top part of the reservoir with the steam generating cavity so as to equalize the pressure between these parts.

This organization includes an opening 37 provided in the forward part of the bottom wall 26 of the reservoir and through which projects a valve body 38. As shown more clearly in Fig. 3, the valve body 38 is a member provided with a pair of parallel flat sides 39 and with arcuate threaded sides 40. The threaded sides 40 are threaded into a nut 41 located under the cover 19, as shown in Fig. 1, and which is rigidly secured thereto in any suitable fashion, as by means of brazing. Mounted on the upper sections of the arcuate sides 40—these sections not being threaded—is a suitable cylindrical tube 42 and located in the reservoir around the assembly of valve body and tube is a ring 45 which is rigidly secured to the valve body and tube in any suitable fashion as by brazing. This outer ring constitutes a shoulder which coacts with the bottom wall 26 of the reservoir and with the nut 41 to hold the assembly of parts in place with the reservoir and cover 19, and which with the nut functions to clamp the cover to the reservoir 18. Preferably, gaskets 46 and 47 will be arranged about the valve body both above and below the bottom wall 26, as shown.

The valve body 38 is provided with a longitudinal water feed passageway 48 extending from side to side of the body and which at its outer ends communicates with the reservoir, as shown, and which at the central part of the valve body communicates with a vertical passageway 49. At the lower end of this passageway 49 there is a discharge port 50. This port 50 is controlled by means of a needle valve 51 which is provided with an operating stem 52. This stem has a threaded section which is received in threaded engagement with a threaded upright sleeve part 53 on the valve body. It will be understood that when the valve stem is turned it will adjust the position of the needle valve with reference to the port 50 and hence regulate the size of its opening to regulate the flow of water from the reservoir to the steam generating cavity 10.

The stem 52, it will be observed, extends upwardly to a point somewhat below the upper end of the tube 42, and at this end it is provided with a transverse driving pin 54. A driving shaft 55 is provided for driving this pin, this shaft having at its lower end a socket 56 in which the upper end of the stem is received and in the side walls of which are provided slots 57 which receive the projecting pin 54 to effect the driving connection between the shaft and the stem.

The actuating shaft 55 is provided with a reduced section 58 adjacent its upper end and on which a knurled head 59 is mounted. An actuating knob 60 is splined on this knurled head and is secured to the shaft by means of a nut 61 threaded on the upper end of the shaft.

The forward handle section 31 is provided with a vertical bore 62 therethrough which receives the tube 42 and the valve operating means including the knob 60, just described. The forward upper part of the handle slopes downwardly, as shown, so that a section of the knob 60 is exposed whereby it may be conveniently operated by the fingers of the operator. Also mounted within this bore 62 is a cylindrical water fill tube 63 having a diameter considerably larger than that of the tube 42, and which surrounds the tube, as shown. This tube 63 at a point adjacent its lower end is rigidly secured to the upper wall 27 of the reservoir so that its lower end section projects down into the reservoir. Threaded in the upper end of this tube is a nut 64, which nut bears against a shoulder 65 provided in the bore 62 so as to clamp the handle and handle baffle 33 assembly down against the reservoir wall 27. This nut is provided with a central opening 66 in its bottom wall through which the valve actuating shaft 55 passes.

The operating knob 60 and the nut 64 constitute passageway means whereby water may be fed into the reservoir 18. For this purpose, both the knob 60 and the nut 64 are in the form of cups, as shown; and in the bottom wall of the cup-shaped knob 60 there are provided a pair of openings 67 (Figs. 1 and 4) through which water poured into the cup will flow down into the bore 62, and thence through the central opening 66 in the cup-shaped nut 64 and through the fill tube 63 into the reservoir. It will be understood that the nut 64 has a liquid-tight fit with the bore so that water cannot flow down around the outside of the fill tube.

Suitable means, however, are provided for normally closing the opening 66 in the nut 64, and which is operated to open it for filling purposes when the knob 60 is depressed. This means comprises a valve 68 mounted upon the actuating rod 55 and which is normally biased to close the opening 66 by means of a compression spring 69; this spring surrounds the valve stem 52 and has its lower end bearing against the valve body and its upper end bearing against the lower end of the shaft 55 so as to bias it and the fill valve 68 upwardly. When it is desired to fill the reservoir the knob 60 is depressed so as to open the fill valve 68, whereby when water is poured into the knob it can flow down directly into the reservoir through the fill tube 63. This may be conveniently done by placing the spout of a pitcher into the knob and forcing it downwardly and at the same time pouring water in from the pitcher.

The valve 68, as shown, comprises a rigid disk attached to the shaft, and which is covered by a washer-like sealing member 68a formed of a suitable material, such as rubber or similar soft resilient compound. This valve not only functions to close the fill opening 66 in the nut 64, but also the member 68a has a relatively high coefficient of friction, and therefore when the valve is seated it functions to prevent the valve knob and stem from rotating accidentally from their adjusted position as by reason of vibration while the iron is in use.

The lower end of the knob 60 is reduced in diameter somewhat and on this reduced section there is provided a tongue 70 (Fig. 4) which coacts with a stop 71, which stop is in the form of a set screw threaded in the forward handle section 31 so as to project into its bore 62, as clearly shown in Figs. 1 and 4. This stop determines the fully "off" and fully "open" positions of the needle valve 51.

It will be observed that because of the flattened shape given the valve body 38 there are provided between it and the tube 42 a pair of vertical passages 72 (Fig. 3) which are permanently open, which by-pass the valve discharge port 50, and which interconnect the steam generating chamber 10 with the inside of the tube 42. It will also be observed that when the fill valve 68 is in its upper closed position of Fig. 1 the upper end of this tube 42 communicates with the space within the surrounding tube 63 and hence with the upper part of the reservoir. In other words, there is a permanently open passage between the steam generating chamber and the reservoir and which bypasses the needle valve, whereby the pressure existing in the steam generating chamber also exists in the upper part of the reservoir. This makes the flow of water from the reservoir entirely independent of the pressure in the steam generating chamber. And this is quite important because at times there is quite a back pressure set up in the steam generating chamber because of the resistance to steam flow offered by certain fabrics. Were this pressure not equalized in the fashion described, the back pressure would tend to retard the dropping of water from the reservoir. Where the pressure above and below the port 50 and needle valve 51 is equalized in the manner described the water will continue to flow into the steam generator at the uniform rate set by the needle valve, irrespective of how great the back pressure may be. It will be understood that when there is such a back pressure created, the pressure in the whole system will increase due to the continuous generation of steam and eventually will overcome the resistance to flow.

When the fill cap 60 is depressed to open the fill valve 68 it at the same time will move the valve down to shut off the upper end of the pressure equalizer tube 42 to prevent water from flowing down through this tube and into the steam generating chamber directly. That is, the valve 68 functions both to close the opening 66 in the nut 64 for normal ironing operations, and also to close the upper end of the equalizer tube 42 for the fill operation.

The rear handle section 32 is provided with a pair of vertically spaced seats 73 and 74 which function to support the iron in a position of rest with its soleplate in a generally upright position as well understood by those skilled in the art. When the iron is so supported, it is desirable to prevent water from flowing from the reservoir out of the fill means, and also out into the steam generating means. The fill valve 68 prevents the first action. The second is prevented as follows: The tube 63 projects down into the reservoir to limit the maximum amount of water that may be fed into the reservoir which amount is indicated by the water level shown in Fig. 1. The volume that may be supplied is such that when the iron is up-ended on the seats 73 and 74 the maximum water level will fall below the needle valve port 50, and also below the lower edge of pressure equalizer tube 42. Thus, at the time the iron is up-ended no water can flow into the steam generator, and therefore the generation of steam is automatically stopped.

The energization of the heating element 3 is controlled automatically by means of a thermostatically-operated switch 75 which preferably will be of the type described and claimed in the United States patent to Harold R. Batchelor No. 2,288,384, dated June 30, 1942. Briefly, this switch comprises a pair of switch contacts 76 connected in series with the supply circuit 78 to the heater 3 and which are operated by means of a bimetallic element 77 which is clamped in heat conducting relation with the soleplate 2. It will be understood that when the switch contacts are closed the heater will be energized, whereas when they are opened responsively to the operation of the bimetallic bar 77 as it heats up, the heater is deenergized. The setting of the thermostatic switch 75 is effected by means of a knob 79 which is connected with the switch by means of a shaft 80. This shaft 80 is directed through a cylinder 81 interposed between the upper and lower walls 26 and 27 of the reservoir, as shown.

In the operation of the iron, it will be understood that the reservoir will be supplied with water through the cup 60 when depressed in the fashion described, and at which time the pressure equalizing tube will be closed by the valve 68 and the nut 64 will be open to permit the water to flow to the reservoir. The lower end of tube 63 limits the quantity of water that can be supplied in the manner and for the purpose described. Then the iron will be plugged in and heated to the desired temperature set by knob 79, and then the needle valve 51 will be opened by means of the knob 60 to obtain the desired flow of water from the reservoir to the steam generating chamber. The steam generated will flow through the passages 16 and 15 to the supply chamber 11 and thence down through the ports 12 to the soleplate. The rate of steam generation, of course, will be regulated by setting the knob 60. When the iron is up-ended on its seats 73 and 74, the flow of water will be stopped because the water level at this time will be below the level of the needle valve port 50.

If it be desired to operate the iron as a normal "dry" iron it is merely necessary to adjust knob 60 to shut off the water flow to the generator and proceed to operate in the usual way.

It will be observed that I have incorporated water flow, water flow regulating means, and pressure equalizing means between the reservoir and the steam generator, all into a simple unitary structure. It should be noted that in assembling this structure, the cup cover 19 first will be placed on and attached to the soleplate, with the nut 41 firmly secured to it. Then the reservoir 18 is set in its position on the soleplate and the valve body 38 inserted through the tube 63 and threaded down into the nut 41. Now the needle valve 51 is threaded into the valve body and the valve shaft 55 slipped down into position with the projecting pin 54 received in its slots 57. Now, the handle assembly is placed on the top of the reservoir and the nut 64 secured in place which operation holds the forward end of the handle to the reservoir. Then the knob 60 is placed upon the upper end of the rod 58 and secured thereto by the nut 61. Now the rear end of the reservoir is secured to the bracket 28 by means of the screw 28b which also functions to hold the rear end of the handle to the reservoir.

While I have shown and described a particular embodiment of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. A steam iron comprising a soleplate having a pressing surface, a steam generating chamber, heating means for said soleplate and chamber, conduit means for conducting steam generated in said chamber to said pressing surface, a water reservoir overlying said soleplate and chamber, a tube extending upwardly from said chamber through said reservoir, means providing communication between the upper end of said tube and the top part of said reservoir, a valve body in said tube partially filling its cross-sectional area so as to leave a permanently open vertical passageway between one side of the body and the tube whereby said chamber always is connected with the top part of said reservoir, said body also having a separate water supply passageway communicating with said chamber and also through said tube with the bottom part of said reservoir so that water may flow by gravity from the reservoir into said chamber, and a valve controlling the flow of water through said water passageway.

2. In a steam iron provided with a soleplate having a pressing surface and a steam generating chamber and heating means for said soleplate and chamber, and also conduit means for conducting steam generated in said chamber to said pressing surface, a water reservoir above said soleplate, a cover for said chamber under said reservoir attached to said plate, a valve body in the lower part of said reservoir having a part extending down through the bottom wall of said reservoir and said cover so as to extend into said chamber, said body being relatively flat in horizontal cross section, a water passageway extending vertically up from the bottom of said body opening at its lower end into said chamber and having a lateral branch connecting it with the bottom of said reservoir, whereby water may flow by gravity from said reservoir to said chamber, an adjustable valve controlling the flow of water through said passageway, means defining a tube around said body liquid sealed to the bottom wall of said reservoir and rising up through said reservoir to a level above the top wall thereof, said tube defining means including a water flow passage connecting with said lateral branch, the spaces between the two sides of said body and tube defining means forming permanently open pressure equalizing passageways connecting said chamber with the top part of said tube defining means, a tube extending up from the top wall of said reservoir around the top part of said tube defining means and functioning to place its upper end in fluid communication with the top part of said reservoir, and adjustable operating means for said valve extending up through said tube and tube defining means.

3. In a steam iron provided with a soleplate having a pressing surface and a steam generating chamber and heating means for said soleplate and chamber, and also conduit means for conducting steam generated in said chamber to said pressing surface, a water reservoir above said soleplate, a cover for said chamber under said reservoir attached to said plate, a valve body in the lower part of said reservoir having a part extending down through the bottom wall of said reservoir and said cover so as to extend into said chamber, said body being relatively flat in horizontal cross section, a water passageway extending vertically up from the bottom of said body opening at its lower end into said chamber and having a lateral branch connecting it with the bottom of said reservoir, whereby water may flow by gravity from said reservoir to said chamber, an adjustable valve controlling the flow of water through said passageway, a tube around said body rising up from said reservoir to a level above the top wall thereof and having a lateral water flow passage communicating with said lateral branch, means connecting and sealing the outer ends of said body with said tube, the spaces between the two sides of said body and tube defining permanently open pressure equalizing passageways connecting said chamber with the top part of said tube, a second tube extending up from the top wall of said reservoir around the top part of said first-named tube and functioning to place its upper end in fluid communication with the top part of said reservoir, a handle for said iron located above said reservoir and having a vertical bore therein through which said second tube passes, a nut under the lower surface of said cover threaded on the said part of said valve body extending down into said chamber and a second nut in said handle bore threaded on the upper end of said second tube and coacting with said handle so as to clamp said handle reservoir and soleplate together, an adjustable operating rod for said valve extending up through said tubes and into said handle bore, and a knob connected to the upper end of said rod and having a part projecting from said handle bore whereby it is accessible for adjustment.

4. A steam iron comprising a soleplate having a steam generating chamber and heating means for the soleplate and chamber, a cover for said chamber attached to said soleplate, a water reservoir located over said soleplate, a valve structure in the lower part of said reservoir controlling the flow of water from said reservoir to said chamber, said structure having a flat-sided valve body provided with a threaded section passed through the bottom wall of said reservoir and said cover, a ring in said reservoir directly above said bottom wall fastened and sealed to the ends of said body and a nut fixed to the under surface of said cover into which said section is threaded so as to clamp said reservoir and cover together and hence the reservoir with said soleplate, a tube around the upper end of said valve body secured and sealed to said ring and said ends of said body and extending upwardly through said reservoir, means placing the upper end of said tube in fluid communication with the top part of said reservoir, said tube and the spaces between the flat sides of said valve body and said ring forming a fluid passageway permanently interconnecting said chamber with said top part of said reservoir, and conduit means for conducting the steam generated in said chamber to the pressing surface of said soleplate.

5. A steam iron comprising a soleplate having a steam generating cavity therein and heating means for the plate and cavity, a cover plate for said cavity, means sealing said cover plate to said soleplate, a water reservoir above said soleplate, a valve structure for controlling the flow of water by gravity from said reservoir to said cavity having a section passed through the bottom wall of said reservoir and said cover so as to project into said cavity, and said structure also having a shoulder bearing on the inner surface of said bottom wall, a nut in said cavity threaded onto said section so as to clamp said reservoir to said cover and hence to said soleplate, said structure in addition having an upright tube passing up through said reservoir to a level above it, and also a water passageway leading from said reservoir to said cavity and a separate pressure equalizing fluid passageway leading from said cavity to said tube, a second tube rising from the top wall of said reservoir placing said reservoir in fluid communication with the top end of said first tube, a handle on said top wall of said reservoir having a vertical bore through which said second tube passes, a nut threaded to the upper end of said second tube bearing on a shoulder provided for it in said handle bore so as to clamp said handle, reservoir, and soleplate together, a valve controlling said water passageway, adjustment means for said valve directed up through said riser tube and handle bore, and steam conduit means connecting said cavity with the pressing surface of said soleplate.

6. A steam iron comprising a soleplate having a steam generator, means for heating said soleplate and generator, a water reservoir arranged to feed water by gravity to said generator, a water fill tube rising up from said reservoir, a valve seat at the upper end of said tube through which water is delivered to said reservoir, a valve biased normally to close said seat and when opened permitting water to flow into said tube and reservoir, a pressure equalizing tube connected at its lower end with said steam generator and rising up into said fill tube so as to place said generator in fluid communication with the top part of said reservoir, said valve when opened moving to close the upper end of said equalizing tube, and steam conduit means interconnecting said steam generator with the pressing surface of said soleplate.

7. A steam iron comprising a soleplate and an operating handle therefor, a steam generating chamber on said soleplate, heating means for heating said chamber and said soleplate, steam conduit means interconnecting said generating chamber with the pressing surfaces of said soleplate, a water reservoir arranged to feed water by gravity to said generating chamber, a water fill tube extending up from said reservoir through a bore provided for it in said handle, a cupshaped fill and valve seat member at the upper end of said tube having an opening in its bottom wall through which water is fed to said reservoir, a fill valve below said bottom wall for closing said opening, means biasing said fill valve upwardly to close said opening and providing for its downward movement to open said opening, a pressure equalizing tube connected at its lower end with said steam generating chamber and rising up in said fill tube so as to place said chamber and the upper part of said reservoir in fluid communication, the upper end of said equalizing tube spaced from said cup-shaped member and positioned to be closed by said valve when it is operated downwardly to open said opening.

8. A steam iron comprising a soleplate, a steam generator on said soleplate, steam conduit means interconnecting said generator with the pressing surface of said soleplate, means for heating said generator and soleplate, a water reservoir, a port for conducting water from said water reservoir to said generator, an adjustable valve for regulating the flow of water through said port, a water fill tube extending up from said reservoir, a valve at the upper end of said tube biased to a first position wherein its closes said tube and movable to a second position to open said tube, a pressure equalizing tube connected at its lower end with said steam generator and rising up in said fill tube so as to place the generator in fluid communication with the top part of said reservoir, said valve when opened moving to close the upper end of said equalizing tube, and a common actuator for operating both of said valve means.

9. A steam iron comprising a soleplate, a steam generator on said soleplate, steam conduit means interconnecting said generator with the pressing surface of said soleplate, means for heating said generator and soleplate, a water reservoir, a conduit for conducting water from said water reservoir to said generator, an adjustable valve for regulating the flow of water through said conduit, a water fill tube leading up from said reservoir, a second valve at the upper end of said tube biased to a first position wherein it closes said tube and movable to a second position to open said tube, a pressure equalizing tube connected at its lower end with said steam generator and rising up in said fill tube so as to place the generator in fluid communication with the top part of said reservoir, said valve when opened moving to close the upper end of said equalizing tube, an adjustment rod for said first-named valve extending up through said equalizing and fill tubes and when rotated effecting adjustments in the flow position of the valve, an actuating knob for said rod, means connecting said knob with said rod to rotate it by the knob but permitting longitudinal motion of the knob relative to said rod, and said knob connected to said second-named valve to move it to said second position responsively to said longitudinal motion of said knob relative to said rod.

10. A steam iron comprising a soleplate and an operating handle therefor, a steam generating chamber on said soleplate, heating means for heating said chamber and said soleplate, steam conduit means interconnecting said generating chamber with the pressing surface of said soleplate, a water reservoir, a conduit for conducting water from said reservoir to said chamber, a valve controlling said conduit adjustable to different positions to regulate the rate of flow of water to said chamber, a water fill tube rising up from said reservoir through a bore provided for it in said handle, a valve seat member at the upper end of said tube through which water is fed to said reservoir, a second valve below said seat, means biasing the second valve upwardly to close said opening and providing for its downward movement to open said opening, a pressure equalizing tube connected at its lower end with said steam generating chamber and rising up in said fill tube so as to place said chamber and the upper part of said reservoir in fluid communication, the upper end of said equalizing tube spaced from said seat and positioned to be closed by said second valve when it is moved down to open said seat, an adjustment rod for said first-named valve extending up through said equalizing and fill tubes and when rotated effecting adjustments in the position of said valve to regulate the flow of water from said reservoir to said chamber, an actuator knob for said rod, means connecting said knob with said rod to rotate the rod by the knob but permitting longitudinal motion of the knob relative to said rod, and said knob connected to said second-named valve to move it down to its open position by depressing said knob.

11. A steam iron comprising a soleplate and an operating handle therefor, a steam generating chamber on said soleplate, heating means for heating said chamber and said soleplate, steam conduit means interconnecting said generating chamber with the pressing surface of said soleplate, a water reservoir under said handle having a port arranged to feed water by gravity to said generating chamber, an adjustable valve for regulating the flow of water through said port, a water fill tube extending up from said reservoir, a fill valve for controlling said fill tube to open it for filling the reservoir and to close it to prevent the escape of water from the reservoir, and common adjusting and operating means for said two valves respectively extending up through said fill tube provided with a stem connected to said first-named valve which extends up into said tube and which when rotated adjusts said first-named valve to regulate the flow of water from said reservoir, a shaft extending down into said tube, a telescopic driving connection between said shaft and stem arranged so that said stem is rotated to adjust said first-named valve by rotating said shaft, and said connection permitting said shaft to telescope down with reference to said stem, and connection means between said second-named valve and shaft for operating the second-named valve to open and close said tube by vertical movements of said shaft with reference to said stem.

12. A steam iron comprising a soleplate and an operating handle therefor, a steam generating chamber on said soleplate, heating means for heating said chamber and said soleplate, steam conduit means interconnecting said generating chamber with the pressing surface of said soleplate, a water reservoir under said handle having a port arranged to feed water by gravity to said generating chamber, an adjustable feed valve for controlling the flow of water through said port, a water fill tube extending up from said reservoir through a bore provided for it in said handle, a cup-shaped fill and valve seat member at the upper end of said tube having an opening in its bottom wall through which water is fed to said reservoir, a fill valve below said bottom wall for closing said opening, means biasing said fill valve upwardly to close said opening and providing for its downward movement to open said opening, a common adjusting and operating means for said two valves extending up through said fill tube and handle bore, provided with a stem connected to said feed valve and extending up into said bore and which when rotated adjusts said feed valve to regulate the rate of water flow from said reservoir, a drive shaft extending down said bore and into said tube, a telescopic driving connection between said shaft and stem arranged so that said stem is rotated to adjust said feed valve by rotating said shaft, and said connection permitting said shaft to telescope down with reference to said stem, connection means between said fill valve and shaft for operating this fill valve to open and close said tube by vertical movements of said shaft with reference to said stem, and a cup-shaped operating knob for said shaft located in the upper part of said bore where it is accessible for operation and having liquid passage means therethrough, means connecting said knob with said shaft, said knob when depressed operating the shaft to open said fill valve and when so depressed constituting fill means through which water is introduced into said bore and thence through said cup-shaped seat member into said fill tube, and when released said knob permitting said biasing means to close said fill valve, and said knob further constituting means for rotating said shaft and stem to adjust said feed valve.

13. A steam iron comprising a soleplate and an operating handle therefor, a steam generating chamber on said soleplate, heating means for heating said chamber and said soleplate, steam conduit means interconnecting said generating chamber with the pressing surface of said soleplate, a water reservoir under said handle having a port arranged to feed water by gravity to said generating chamber, an adjustable feed valve for regulating the flow of water through said port, a water fill tube extending up from said reservoir through a bore provided for it in said handle, a cup-shaped fill and valve seat member at the upper end of said tube having an opening in its bottom wall through which water is fed to said reservoir, a fill valve below said bottom wall for closing said opening, means biasing said fill valve upwardly to close said opening and yielding to permit it to move downward to open said opening, a common adjusting and operating means for said two valves extending up through said fill tube and handle bore, provided with a stem connected to said feed valve and extending up into said bore and which when rotated adjusts said feed valve to regulate the rate of water flow from said reservoir, a drive shaft extending down said bore and into said tube, a telescopic driving connection between said shaft and stem arranged so that said stem is rotated to adjust said feed valve by rotating said shaft, and said connection permitting said shaft to telescope down with reference to said stem, connection means between said fill valve and shaft for operating this fill valve to open and close said tube by vertical movements of said shaft with reference to said stem, an operating knob for said shaft connected to the upper end thereof where it is accessible for operation, means connecting said knob with said shaft, said knob when depressed operating the shaft to open said fill valve and when released permitting said biasing means to close said fill valve, and said knob further constituting means for rotating said shaft and stem to adjust said feed valve.

14. A steam iron comprising a soleplate and an operating handle therefor, a steam generating chamber on said soleplate, heating means for said chamber and soleplate, steam conduit means interconnecting said generating chamber with the pressing surface of said soleplate, a water reservoir under said handle having a port in the lower part thereof for feeding water by gravity to said generating chamber, a water fill tube fixed to and extending up from said reservoir, said handle having a bore into which said tube projects and into the upper end of which water for said reservoir is introduced, a fill and valve seat nut member threaded into the upper end of said tube coacting with said handle to clamp it to said reservoir and having an opening for the passage of water from said bore into said tube, a fill valve controlling said opening, an actuating shaft for said valve in said tube extending up into said bore and operating when depressed to open said valve, means biasing the shaft upwardly to close said valve, a feed valve controlling said port, and driving connection means between said feed valve and shaft so that the feed valve is adjusted by rotating said shaft.

15. A steam iron comprising a soleplate and an operating handle therefor, a steam generating chamber on said soleplate, heating means for said chamber and soleplate, steam conduit means interconnecting said generating chamber with the pressing surface of said soleplate, a water reservoir under said handle having a port in the lower part thereof for feeding water by gravity to said generating chamber, a water fill tube fixed to and extending up from said reservoir, said handle having a bore into which said tube projects and into the upper end of which water for said reservoir is introduced, a fill and valve seat nut member threaded into the upper end of said tube coacting with said handle to clamp it to said reservoir and having an opening for the passage of water from said bore into said tube, a fill valve controlling said opening, an actuating shaft for said valve in said tube extending up into said bore and operating when depressed to open said valve, means biasing the shaft upwardly to close said valve, a feed valve controlling said port, driving connection means between said feed valve and shaft so that the feed valve is adjusted by rotating said shaft, and a cup-shaped fill and operating knob for said shaft located in the upper end portion of said bore connected with said shaft and having discharge opening in its bottom wall for discharging water poured into it down into said bore.

16. A steam iron comprising a soleplate and an operating handle therefor, a steam generating chamber on said soleplate, heating means for said chamber and soleplate, steam conduit means interconnecting said generating chamber with the pressing surface of said soleplate, a water reservoir under said handle having a port in the lower part thereof for feeding water by gravity to said generating chamber, a water fill tube fixed to and extending up from said reservoir, said handle having a bore into which said tube projects and into the upper end of which water for said reservoir is introduced, a member closing the upper end of said tube having an opening for the passage of water from said bore into said tube and having a liquid-tight seal with said bore, a valve controlling said opening, an actuating shaft for said valve in said tube extending up into said bore and operating when depressed to open said valve, means biasing said shaft upwardly to close said valve, a feed valve controlling said port, and driving connection means between said feed valve and shaft so that the feed valve is adjusted by rotation of said shaft.

17. A steam iron comprising a soleplate and an operating handle therefor, a steam generating chamber on said soleplate, heating means for said chamber and soleplate, steam conduit means interconnecting said generating chamber with the pressing surface of said soleplate, a water reservoir under said handle having a port in the lower part thereof for feeding water by gravity to said generating chamber, a water fill tube fixed to and extending up from said reservoir, said handle having a bore into which said tube projects and into the upper end of which water for said reservoir is introduced, a member closing the upper end of said tube having an opening for the passage of water from said bore into said tube and having a liquid-tight seal with said bore, a fill valve controlling said opening, an actuating shaft for said valve in said tube extending up into said bore and operating when depressed to open said valve, means biasing said shaft upwardly to close said valve, a feed valve controlling said port, driving connection means between said feed valve and shaft so that the feed valve is adjusted by rotation of said shaft, and said fill valve having a sealing material having a high coefficient of friction such that when it is held against said seat by said biasing means it frictionally engages it in order to prevent accidental rotation of said shaft.

FRANK E. FINLAYSON.

REFERENCES CITED

The following references are of record in the file of this patent:

UNITED STATES PATENTS

| Number | Name | Date |
| --- | --- | --- |
| 2,288,384 | Batchelor | June 30, 1942 |
| 2,288,785 | Carlson | July 7, 1942 |
| 2,295,341 | Finlayson | Sept. 8, 1942 |
| 2,322,593 | Riddington et al. | June 22, 1943 |
| 2,384,839 | Kistner | Sept. 18, 1945 |